April 25, 1944.  H. H. B. DEANE  2,347,466
RESILIENT WHEEL
Filed April 24, 1943  3 Sheets-Sheet 3

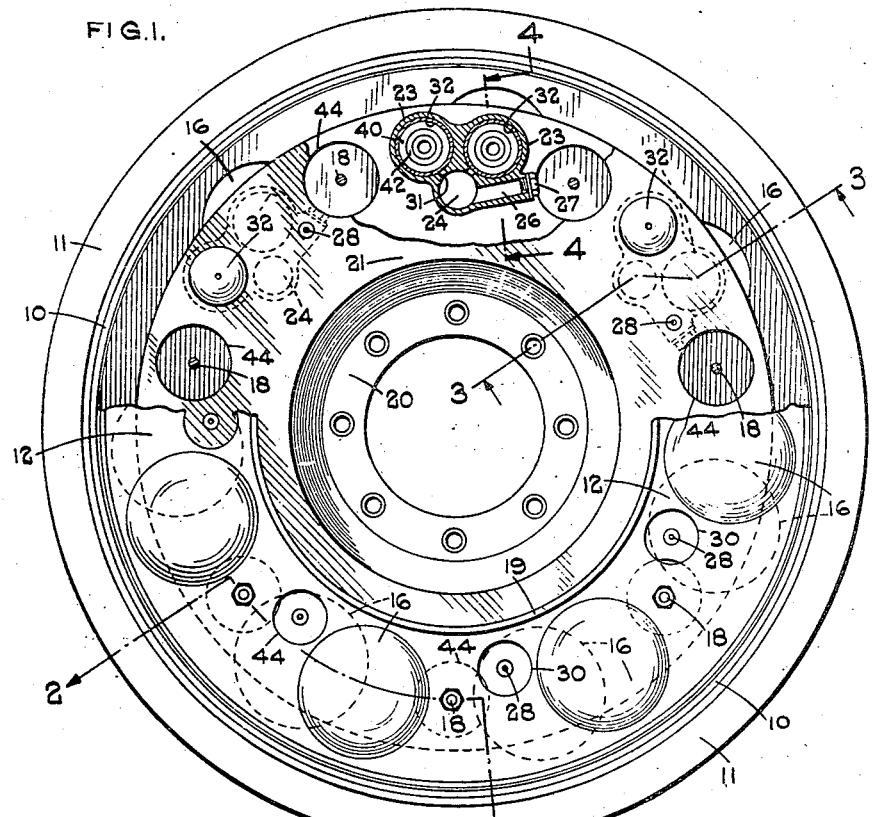

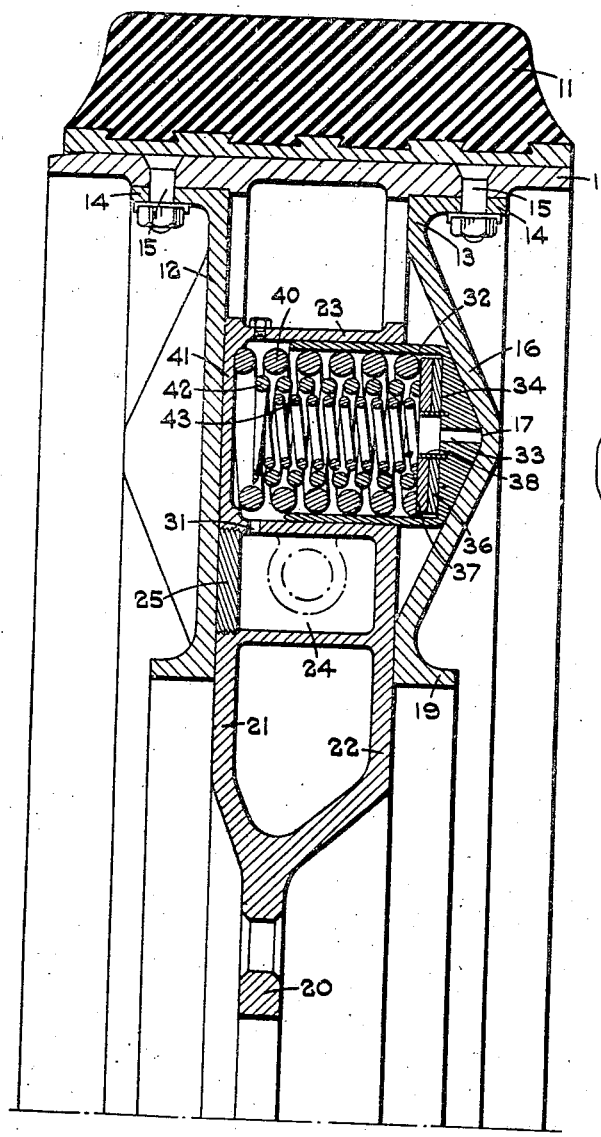

INVENTOR
Herbert H. B. Deane.
By Henry J. Locke
his ATTORNEY.

Patented Apr. 25, 1944

2,347,466

UNITED STATES PATENT OFFICE 2,347,466

RESILIENT WHEEL

Herbert Henry Branson Deane, Edgbaston, Birmingham, England

Application April 24, 1943, Serial No. 484,416
In Great Britain April 1, 1942

6 Claims. (Cl. 152—23)

This invention relates to resilient wheels of the kind in which there are separate rim and hub units capable of moving under stress into a position in which they are eccentric to one another, and when they do so, compressing springs arranged in housings which in certain known constructions are parallel to the wheel axis, the arrangement being such that the springs act upon plungers having tapering ends which co-operate with concavities in plates carried by the companion member.

Such mechanism is disclosed in my prior British specifications Nos. 404,325 and 404,326, and in these constructions the housings have been open at both ends and each end has been provided with a plunger, the housings being formed in the hub member and the concavely dished plates being associated with the rim member.

The object of the present invention is to provide an improved construction whereby the thickness or sectional width of the wheel can be reduced to enable such wheels to be used under conditions where it has hitherto been impracticable owing to the space available for the wheel being insufficient.

According to the present invention, the housings are closed at one end and fitted with a plunger at the other end, and the housings are preferably arranged alternately so that the open end of one is disposed at the opposite side of the wheel from that side where the open end of the next housing is situated. In this way the total width or thickness of the wheel is greatly reduced so that the wheel can be used in many vehicles, for instance, electrically propelled railway vehicles and certain other trucks and lorries where such resilient wheels had been inapplicable owing to insufficient space. The invention is also applicable to landing wheels for aircraft.

A further feature of the present invention is to assemble the wheel with the springs in the stressed condition so that the tapered ends of the plungers will occupy a position which is coaxial with the corresponding concavities or substantially so when the vehicle to which the wheels are applied, is stationary.

Referring to the drawings—

Figure 1 is a view in side elevation partly in section.

Figure 2 is a section on line 2—2 of Figure 1.

Figure 3 is a section on line 3—3 of Figure 1.

Figure 4 is a section on line 4—4 of Figure 1.

Figures 2, 3 and 4 are drawn to a larger scale than Figure 1.

Figure 5:
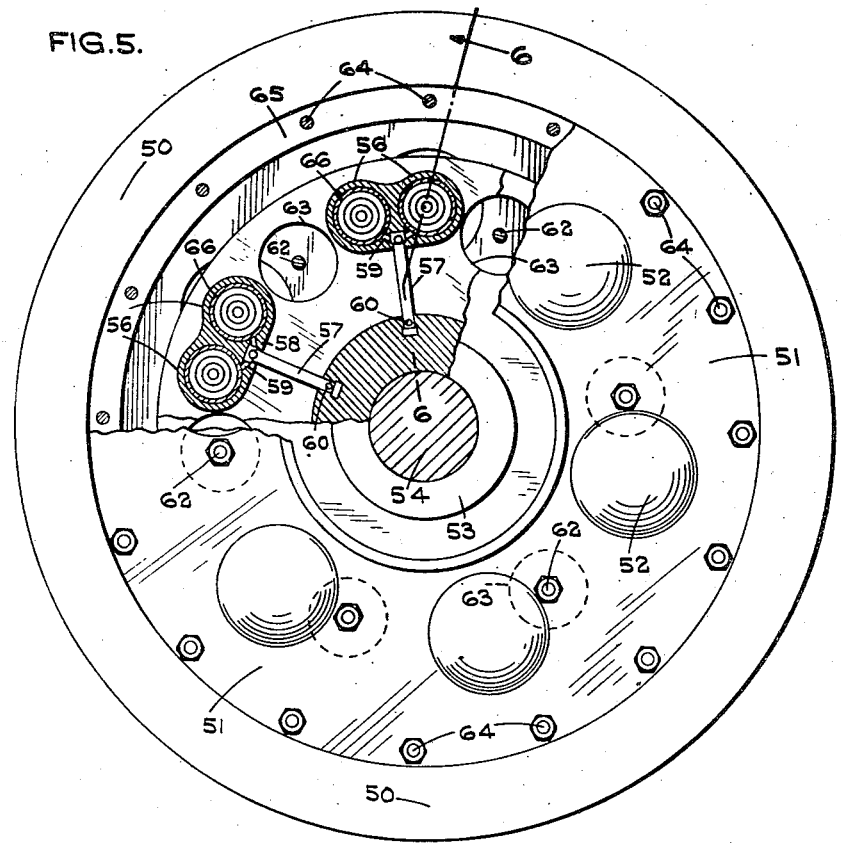
Figure 5 is a sectional view in side elevation showing another construction.

In the construction shown in Figures 1 to 4, the rim unit comprises a rim 10 which may be fitted with a tyre 11 and which carries two plates formed as rings 12, 13. These rings are flanged as shown at 14 at the periphery and are secured by bolts 15 to the rim member 10.

Each of the rings 12 and 13 is formed with a number of spaced concavities 16 of conical shape, each cone having its apex 17 somewhat rounded.

The conical parts 16 of the ring 12 are staggered in relation to the conical parts 16 of the ring 13 as shown clearly in Figures 1 and 2.

The two rings 12 and 13 are secured together at intervals by bolts 18, and at their inner peripheries the two rings are stiffened by flanges 19. The bolts 18 are provided with shoulders 67 which space apart the plates 12 and 13 by a distance equal to the rim portion of the hub member, to give clearance therebetween for lubrication.

Each hub member is formed with an inner flange 20 with which the hub of the wheel is associated, and the rim of the hub unit is of hollow section comprising two flat sides 21 and 22 which slide between the plates 12 and 13.

The rim portion of the hub unit is further formed with a plurality of cylinders 23, one for each of the concavities 16. The cylinders 23 are arranged in pairs as shown in Figures 1 and 2, the cylinders of each pair being open at opposite ends.

With each adjacent pair of cylinders 23 is formed a lubricating chamber 24, one end of which is closed by a screwed plug 25, and this lubricating chamber is provided with a tubular passage 26, the end of which is closed by a plug 27, and the side of which is provided with a lubricating nipple 28 situated in a recess 29 in the side of the unit.

The adjacent plate 12 of the rim unit is provided with holes 30 in order to provide access to the nipples 28, and the holes 30 are large enough to permit of access being obtained to the nipples when the rim unit has moved into eccentric relationship with the hub unit.

The lubricating chamber 24 communicates by means of ports 31 with each of the cylinders 23.

By placing the lubricating chambers 24 nearer the centre of rotation of the wheel than the cylinders 23, centrifugal force tends to maintain a feed of lubricant from the chambers to the cylinders.

Each cylinder 23 contains a hollow plunger 32 which is of conical form at its outer end to correspond with the cones of the parts 16, the end of the cone on the plunger being rounded as shown.

The conical end of each plunger is closed except for a port 33 enabling grease to reach the contacting surfaces of the plunger and the cone 16.

Within this end of the cone is provided a flat surface 34 against which bears a washer 36 which may be made of bronze, and associated with this washer is a washer 37.

The two washers 36 and 37 are centralised by a tubular sleeve 38, one end of which engages a recess in the end of the plunger. In operation the piston rotates on its own centre as also does the washer 36, while the washer 37 remains stationary.

A strong pre-stressed compression spring 40 acts between one side of the washer 37 and the opposite end 41 of the cylinder 23 which is closed. The pre-stressing of this spring retains the plunger co-axial with the cone 16 with which it engages when the wheel is assisting in supporting the weight of the vehicle and load.

Two further springs are shown. One, 42, is weaker than the spring 40, and the other 43, is weaker than the spring 42. Further, the spring 42 is shorter than the spring 40, and the spring 43 is shorter than the spring 42 so that as the plunger is moved endwise, the springs come into action successively, and the load on the plunger is increased not at a uniform rate but at a rate which increases with the degree of movement.

The springs are all helical springs, and the outer spring 40 and inner spring 43 are of the same hand, while the intermediate spring 42 is of the opposite hand.

Where the bolts 18 securing the plates 12 and 13 together pass through the sides 21 and 22 of the hub unit, the latter are provided with large holes 44 so as to allow the two units to move into an eccentric position without the edges of the holes coming into contact with the bolts.

Figure 6:
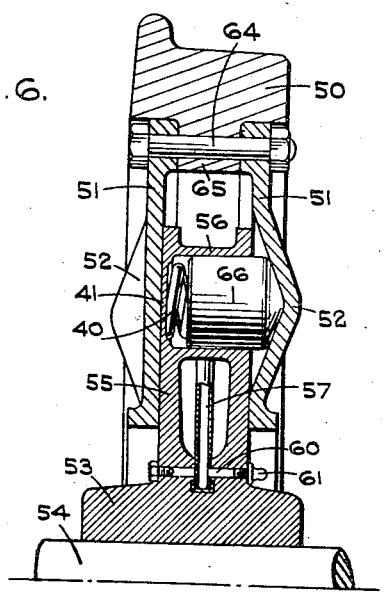
Figure 6 is a sectional view on line 6—6 of Figure 5.

In the construction shown in Figures 5 and 6, the invention is shown as applied to a wheel for a railway vehicle, the rim unit consisting of a rim member 50 made to a suitable section, and bolted to the rim member are two side plates 51 each formed with concavities 52 on its inner side, these concavities being staggered around the wheel.

The hub unit 53 is forced on to the axle 54 and is provided with flanges 55 engaging between the side plates 51 of the rim unit, and these flange portions 55 incorporate cylindrical housings 56 arranged parallel to the axis and arranged alternately, i. e., the open end of one housing is at one side, and the open end of the next housing is at the opposite side. The centres of these housings are disposed all on the same circle.

In its open end each housing is provided with a plunger 66 having a conical end and loaded as described with reference to Figures 1 to 4.

Provision is preferably made for lubrication by providing tubes 57 for the passage of lubricant leading to the housings, and ports are provided extending through the ends of the plungers as described in connection with Figures 1 to 4, so that the surfaces of the ends of the plungers and the concavities in the side plates may be lubricated. The outer ends of the tubes 57 are each located in a recess in a web 58 connecting two adjacent cylindrical housings, and ports 59 are provided communicating with the two housings.

At their inner ends the tubes 57 engage in recesses in the hub member, and the hub member is drilled axially as shown at 60 and fitted with a lubricating nipple 61. The tubes 57 are kept filled with lubricant and centrifugal force tends to cause it to flow into the cylinder.

In between each adjacent pair of housings, the side plates 51 are secured together by bolts 62 passing through large openings 63 in the portion 55, and the plates 51 are further secured together by bolts 64 near the periphery where the two plates engage on either side of an inwardly projecting flange 65 on the rim member 50.

What I claim then is:

1. A resilient wheel comprising a rim unit and a hub unit, the rim unit having a pair of spaced side plates formed with concavities, the concavities in one side plate being staggered in relation to the concavities in the other side plate, the hub unit having a portion engaging between said side plates, said portion being formed with cylinders, each of said cylinders being open at one end and closed at the opposite end, said cylinders each being co-axial with one of said concavities and with its open end directed towards a concavity, a hollow plunger in each cylinder having its open end directed towards the closed end of the cylinder, and having its opposite end shaped to correspond with the shape of the concavity, a plurality of springs in each cylinder acting on the plunger, one of which springs is pre-stressed, and a pair of washers in each plunger between the springs and the end of the plunger adjacent the concavity.

2. A resilient wheel comprising a rim unit and a hub unit, the rim unit having a pair of spaced side plates formed with concavities, the concavities in one side plate being staggered in relation to the concavities in the other side plate, the hub unit having a portion engaging between said side plates, said portion being formed with cylinders, each of said cylinders being open at one end and closed at the opposite end, said cylinders each being co-axial with one of said concavities and with its open end directed towards a concavity, a hollow plunger in each cylinder having its open end directed towards the closed end of the cylinder, and having its opposite end shaped to correspond with the shape of the concavity, and a plurality of springs in each cylinder acting on the plunger, said hub member having lubricating chambers disposed nearer the centre of the wheel than are the cylinders, said cylinders and said plungers having ports enabling the lubricant to reach the engaging surfaces of the plungers and the concavities.

3. A resilient wheel comprising a rim unit and a hub unit, the rim unit having a pair of spaced side plates formed with concavities, the concavities in one side plate being staggered in relation to the concavities in the other side plate, the hub unit having a portion engaging between said side plates, said portion being formed with cylinders, each of said cylinders being open at one end and closed at the opposite end, said cylinders each being co-axial with one of said concavities and with its open end directed towards a concavity, a hollow plunger in each cylinder having its open end directed towards the closed end of the cylinder, and having its opposite end shaped to correspond with the shape of the concavity, a plurality of springs in each cylinder acting on the plunger, said hub member having a periphery of channel section with the cylinders arranged in pairs with oppositely directed open ends, and a lubricating chamber formed in the portion of channel section and on the inner side of each pair of cylinders, said cylinders and said plungers having ports enabling the lubricant to reach the engaging surfaces of the plungers and the concavities.

4. A resilient wheel of the kind described, having a rim unit and a hub unit, one of which is provided with a pair of spaced side plates between which is an annular channel, the side plates being formed each with a plurality of conical pockets on their inner sides, the pockets in one plate being staggered in relation to the pockets in the other plate, and the other unit having an annular portion of hollow section, opposite sides of which make sliding contact between the side plates of the first unit, cylinders in said annular portion corresponding in number and position with said pockets, said cylinders being parallel to the axis of the wheel, and each being closed at one end and open at the other and containing a spring-loaded piston having a conical end protruding from the end of the cylinder and engaging in one of the pockets.

5. A resilient wheel according to claim 4, having a plurality of washers interposed between the ends of the springs and the conical ends of the pistons.

6. A resilient wheel according to claim 4, including lubricating chambers in the unit containing the cylinders disposed nearer to the centre of rotation than the cylinders, the walls between such lubricating chambers and the cylinders having openings for the passage of lubricant.

HERBERT HENRY BRANSON DEANE.